United States Patent
Ahn et al.

(10) Patent No.: US 10,205,571 B2
(45) Date of Patent: Feb. 12, 2019

(54) METHOD AND APPARATUS FOR PERFORMING COMMUNICATION BASED ON HYBRID BEAMFORMING IN WIRELESS COMMUNICATION SYSTEM

(71) Applicant: LG ELECTRONICS INC., Seoul (KR)

(72) Inventors: Minki Ahn, Seoul (KR); Jaehoon Chung, Seoul (KR); Kilbom Lee, Seoul (KR); Kyuseok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 146 days.

(21) Appl. No.: 15/453,771

(22) Filed: Mar. 8, 2017

(65) Prior Publication Data

US 2017/0367114 A1    Dec. 21, 2017

Related U.S. Application Data

(60) Provisional application No. 62/350,733, filed on Jun. 16, 2016, provisional application No. 62/353,059, filed on Jun. 22, 2016.

(51) Int. Cl.
*H04B 7/06* (2006.01)
*H04L 5/00* (2006.01)
*H04B 7/0456* (2017.01)

(52) U.S. Cl.
CPC ......... *H04L 5/0048* (2013.01); *H04B 7/0469* (2013.01); *H04B 7/0617* (2013.01)

(58) Field of Classification Search
CPC ................................................ H04W 72/1284
USPC .......................................................... 370/329
See application file for complete search history.

(56) References Cited

U.S. PATENT DOCUMENTS

| | | | | |
|---|---|---|---|---|
| 2009/0175214 A1* | 7/2009 | Sfar | .................. | H04B 7/15592 370/315 |
| 2011/0280188 A1* | 11/2011 | Jeon | ..................... | H04B 7/0413 370/328 |
| 2013/0336176 A1* | 12/2013 | Rubin | ...................... | H04B 7/26 370/280 |
| 2015/0349866 A1* | 12/2015 | Benjebbour | .............. | H04L 5/00 370/329 |
| 2015/0358064 A1* | 12/2015 | Benjebbour | ......... | H04B 7/0452 370/329 |
| 2016/0269159 A1* | 9/2016 | Soriaga | ................. | H04L 5/0048 |

* cited by examiner

*Primary Examiner* — Shripal K Khajuria
(74) *Attorney, Agent, or Firm* — Lee, Hong, Degerman, Kang & Waimey PC

(57) ABSTRACT

Provided are a method and an apparatus for performing communication based on hybrid beamforming in a wireless communication system. Specifically, a user equipment (UE) transmits a dedicated scheduling request to a base station (BS). The dedicated scheduling request indicates a first scheduling request that is a request to transmit beam state information, multiplexed on an uplink data channel, or a second scheduling request that is a request to allocate a resource for a reference signal for beam refinement information. When the dedicated scheduling request indicates the first scheduling request, the UE receives an uplink grant including a response to the first scheduling request from the BS. The UE feeds the BSI back multiplexed on the uplink data channel to the BS.

12 Claims, 11 Drawing Sheets

METHOD AND APPARATUS FOR PERFORMING COMMUNICATION BASED ON HYBRID BEAMFORMING IN WIRELESS COMMUNICATION SYSTEM

CROSS-REFERENCE TO RELATED APPLICATION

Pursuant to 35 U.S.C. § 119(e), this application claims the benefit of U.S. Provisional Patent Application Nos. 62/350,733, filed on Jun. 16, 2016 and 62/353,059, filed on Jun. 22, 2016, the contents of which are all hereby incorporated by reference herein in their entirety.

BACKGROUND OF THE INVENTION

Field of the Invention

The present invention relates to wireless communications, and more particularly, to a method of performing communication based on hybrid beamforming in a wireless communication system, and an apparatus using the same.

Related Art

Methods for supporting a higher data transmission rate have been studied for a wireless communication system to satisfy a steadily increasing demand for wireless data traffic. As one of these methods, a beamforming-based base station employing a wide frequency band of a millimeter wave (mmWave) band is used, expecting a drastic increase in capacity of the cellular system.

Meanwhile, to transmit a plurality of pieces of information to a single user or multiple users, a Multi Input Multi Output (MIMO) system, which is considered in the existing Long Term Evolution (LTE)-Advanced standard, has multiple digital paths or radio frequency (RF) chains. When MIMO communication is performed using these multiple digital paths, a performance gain, such as a diversity gain or multiplexing gain, may be obtained. However, when the number of digital paths is increased to obtain a higher gain, issues about synchronization between digital paths, costs, and operational complexity may arise.

A millimeter wave band system may offset the disadvantage of path attenuation by a beamforming gain using a large number of physical antennas. However, in the existing MIMO system, a digital beamforming technique involves one RF chain for one physical antenna and thus needs a large number of RF chains, which causes problems of costs and operational complexity. Thus, a hybrid beamforming system using digital beamforming and analog beamforming at the same time may be considered for efficient communication in a millimeter wave band. Analog beamforming may form a narrow beam by connecting an array of a plurality of physical antennas to one RF chain and using a phase shifter. As compared with digital beam forming, analog beamforming is inferior in bam sharpness and flexibility in directional adjustment, but has low implementation costs and low complexity due to no increase in the number of digital paths. A hybrid beamforming system resulting from an appropriate combination of advantages and disadvantages of digital beamforming and analog beamforming may be considered in order to efficiently obtain a high communication capacity in a millimeter wave band.

SUMMARY OF THE INVENTION

The present specification provides a method and an apparatus for performing communication based on hybrid beamforming in a wireless communication system.

The present specification proposes a method of performing communication based on hybrid beamforming in a wireless communication system.

First, a user equipment (UE) transmits a dedicated scheduling request to a base station (BS). The dedicated scheduling request indicates a first scheduling request that is a request to transmit beam state information (BSI), multiplexed on an uplink data channel, or a second scheduling request that is a request to allocate a resource for a reference signal for beam refinement information (BRI).

Here, the uplink data channel may correspond to an xPUSH. That is, the first scheduling request may correspond to a request to multiplex beam related UCI on the xPUSCH. The reference signal for the BRI may correspond to a beam refinement reference signal (BRRS).

When the dedicated scheduling request indicates the first scheduling request, the UE receives an uplink grant including a response to the first scheduling request from the BS. The response to the first scheduling request may correspond to scheduling information from the BS that enables the UE to feed back BSI.

The UE multiplexes the BSI on the uplink data channel to be fed back to the BS.

The BSI may include a beam index and a beam received power. The beam index and the beam received power may be information on an optimal beam for the UE. The optimal beam for the UE may correspond to a beam having the highest received power in a candidate beam set. Specifically, when a beam mismatch occurs between the BS and the UE, the UE needs to report BSI on a next best candidate beam to the BS, in which the number of next best candidate beams may be indicated with bits of the uplink grant.

For example, suppose that the uplink grant includes a field of two bits. When the field indicates 00, the candidate beam set may include no candidate beam (disabled). When the field indicates 01, the candidate beam set may include one candidate beam. When the field indicates 10, the candidate beam set may include two candidate beams. When the field indicates 11, the candidate beam set may include four candidate beams.

When the dedicated scheduling request indicates the second scheduling request, the UE may receive downlink control information indicating the allocation of the resource for the reference signal for the BRI from the BS. Further, the UE may feed the BRI back to the BS based on the downlink control information.

Here, when a beam mismatch occurs between the BS and the UE, a next best candidate beam may also be mismatched between the BS and the UE, thus proposing a method for matching a new beam pair between the BS and the UE. Here, a beam reference signal (BRS) may be a reference signal used to roughly match a beam pair in an initial stage of a beamforming procedure, and a BRRS may be a reference signal used to more accurately match the beam pair in order to directly transmit and receive data after roughly matching the beam pair. That is, the UE may perform beam refinement on a rough beam through a BRRS.

The BRI may include an index of the resource for the reference signal for the BRI and the received power of the reference signal for the BRI.

The BSI and the BRI may be fed back through a medium access control-control element (MAC-CE).

Further, the present specification proposes an apparatus for performing communication based on hybrid beamforming in a wireless communication system.

The apparatus may be a UE. The apparatus includes a radio frequency (RF) unit to transmit and receive a radio signal, and a processor connected to the RF unit. First, the processor transmits a dedicated scheduling request to a base station (BS). The dedicated scheduling request indicates a first scheduling request that is a request to transmit beam state information (BSI), multiplexed on an uplink data channel, or a second scheduling request that is a request to allocate a resource for a reference signal for beam refinement information (BRI).

Here, the uplink data channel may correspond to an xPUSH. That is, the first scheduling request may correspond to a request to multiplex beam related UCI on the xPUSCH. The reference signal for the BRI may correspond to a beam refinement reference signal (BRRS).

When the dedicated scheduling request indicates the first scheduling request, the processor receives an uplink grant including a response to the first scheduling request from the BS. The response to the first scheduling request may correspond to scheduling information from the BS that enables the UE to feed back BSI.

The processor multiplexes the BSI on the uplink data channel to be fed back to the BS.

The BSI may include a beam index and a beam received power. The beam index and the beam received power may be information on an optimal beam for the UE. The optimal beam for the UE may correspond to a beam having the highest received power in a candidate beam set. Specifically, when a beam mismatch occurs between the BS and the UE, the UE needs to report BSI on a next best candidate beam to the BS, in which the number of next best candidate beams may be indicated with bits of the uplink grant.

For example, suppose that the uplink grant includes a field of two bits. When the field indicates 00, the candidate beam set may include no candidate beam (disabled). When the field indicates 01, the candidate beam set may include one candidate beam. When the field indicates 10, the candidate beam set may include two candidate beams. When the field indicates 11, the candidate beam set may include four candidate beams.

When the dedicated scheduling request indicates the second scheduling request, the processor may receive downlink control information indicating the allocation of the resource for the reference signal for the BRI from the BS. Further, the processor may feed the BRI back to the BS based on the downlink control information.

Here, when a beam mismatch occurs between the BS and the UE, a next best candidate beam may also be mismatched between the BS and the UE, thus proposing a method for matching a new beam pair between the BS and the UE. Here, a beam reference signal (BRS) may be a reference signal used to roughly match a beam pair in an initial stage of a beamforming procedure, and a BRRS may be a reference signal used to more accurately match the beam pair in order to directly transmit and receive data after roughly matching the beam pair. That is, the UE may perform beam refinement on a rough beam through a BRRS.

The BRI may include an index of the resource for the reference signal for the BRI and the received power of the reference signal for the BRI.

The BSI and the BRI may be fed back through a medium access control-control element (MAC-CE).

The present specification proposes an operation of a UE requesting the multiplexing of beam related UCI on an xPUSCH or requesting a BRRS using the same dedicated scheduling request resource, and an operation of a BS receiving such requests. In the foregoing operation, the UE transmits the different requests via the same scheduling request resource, an ambiguity issue may occur in the BS. However, the BS deals with a response to the scheduling request in view of scheduling, thereby addressing the ambiguity issue in a hybrid beamforming system.

DESCRIPTION OF EXEMPLARY
EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink.

For clarity of explanation, the following description will focus on the 3GPP LTE. However, technical features of the present invention are not limited thereto.

Figure 1:
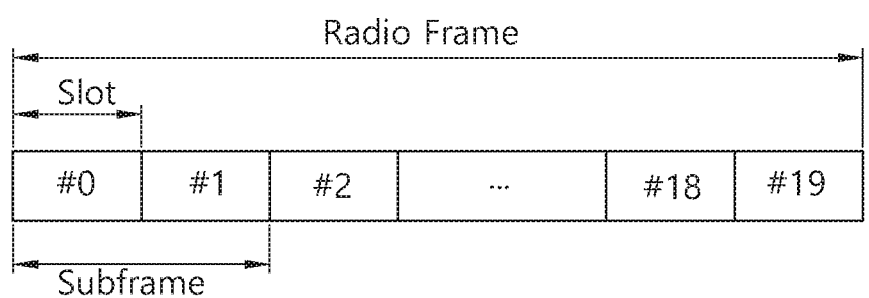
FIG. 1 shows a structure of a radio frame in 3GPP LTE.

FIG. 1 shows a structure of a radio frame in 3GPP LTE.

Referring to FIG. 1, the radio frame consists of 10 subframes. One subframe consists of 2 slots. The slots in the radio frame are numbered from slot number 0 to 19. A time required for transmitting one subframe is defined as a transmission time interval (TTI). The TTI is a unit of scheduling for transmitting a data. For example, one subframe may have a length of 1 millisecond (ms), and one slot may have a length of 0.5 ms.

The structure of the radio frame is for exemplary purposes only, and the number of subframes included in the radio frame or the number of slots included in the subframe and the number of SC-FDMA symbols included in the slot can change variously.

Figure 2:
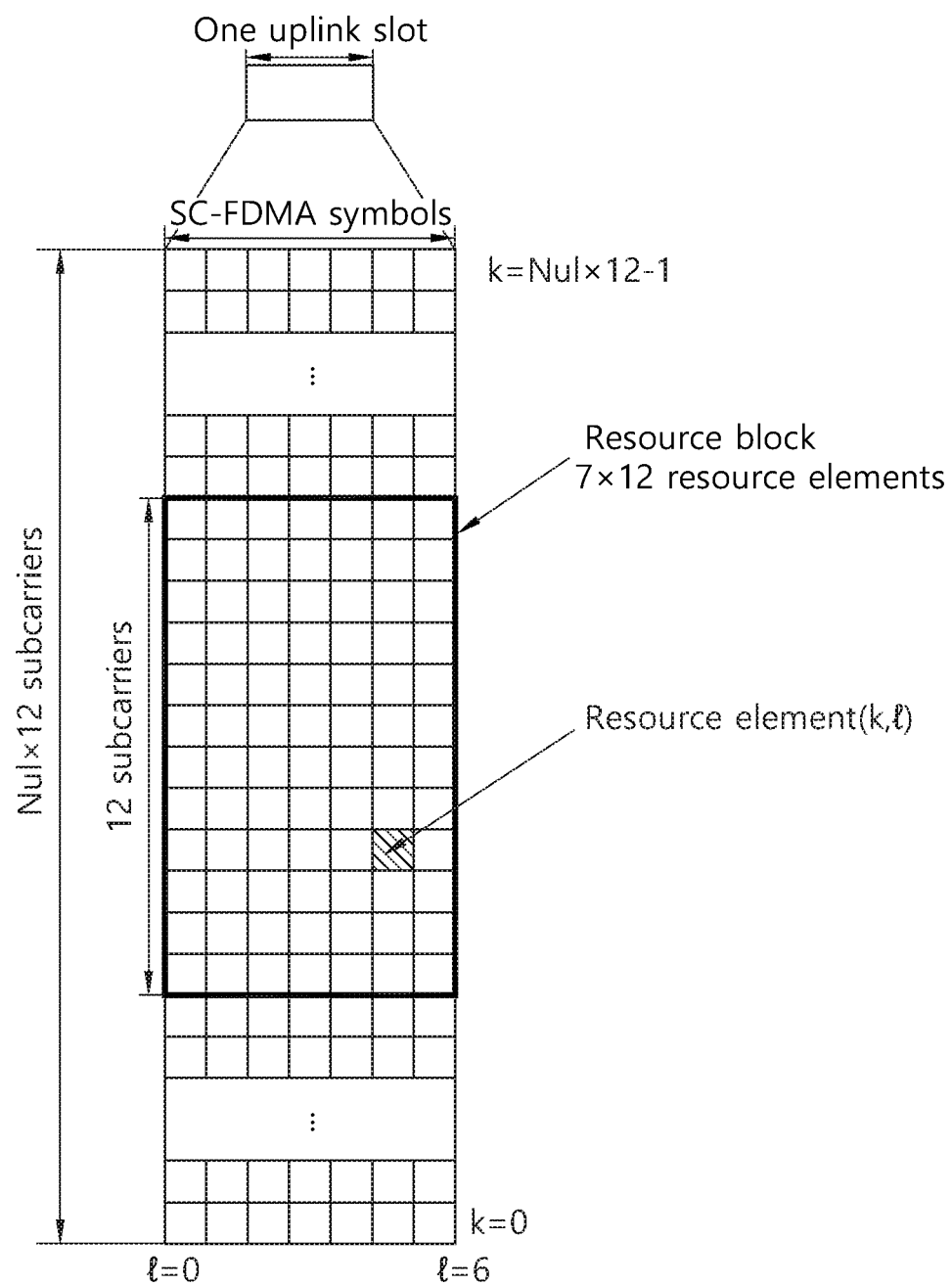
FIG. 2 is a diagram showing an example of a resource grid for one uplink slot in 3GPP LTE.

FIG. 2 is a diagram showing an example of a resource grid for one uplink slot in 3GPP LTE.

Referring to FIG. 2, The UL slot includes a plurality of SC-FDMA symbols in a time domain and includes a plurality of NUL RBs in a frequency domain. It is described that the SC-FDMA symbols are for representing one symbol period, and the SC-FDMA symbols can be OFDM symbols or symbol period according to the system. The RBs are a unit of resource allocation in the frequency domain and include 12 subcarriers. The number NUL of RBs included in the UL slot depends on a UL bandwidth defined in a cell. The UL bandwidth is system information. The UE may know NUL by acquiring the system information.

Each element on the resource grid is referred to as a resource element. One RB includes 12☐7 resource elements. The resource element on the resource grid can be identified by an index pair (k, l) within the slot. Herein, $k(k=0, \ldots, NUL \times 12-1)$ denotes a subcarrier index in the frequency domain, and $l(l=0, \ldots, 6)$ denotes an SC-FDMA symbol index in the time domain.

Although it is described herein that one RB includes 7☐12 resource elements consisting of 7 SC-FDMA symbols in the time domain and 12 subcarriers in the frequency domain for example, the number of SC-FDMA symbols and the number of subcarriers in the RB are not limited thereto. Thus, the number of subcarriers or the number of SC-FDMA symbols included in the RB may change variously. The number of SC-FDMA symbols may change depending on a cyclic prefix (CP) length. For example, when using a normal CP, the number of SC-FDMA symbols included in one slot is 7, and when using an extended CP, the number of SC-FDMA symbols included in one slot is 6.

In 3GPP LTE of FIG. 2, a resource grid for a single uplink slot may also be applied to a resource grid for a downlink slot. In this case, the downlink slot includes a plurality of orthogonal frequency division multiplexing (OFDM) symbols in a time domain.

Figure 3:
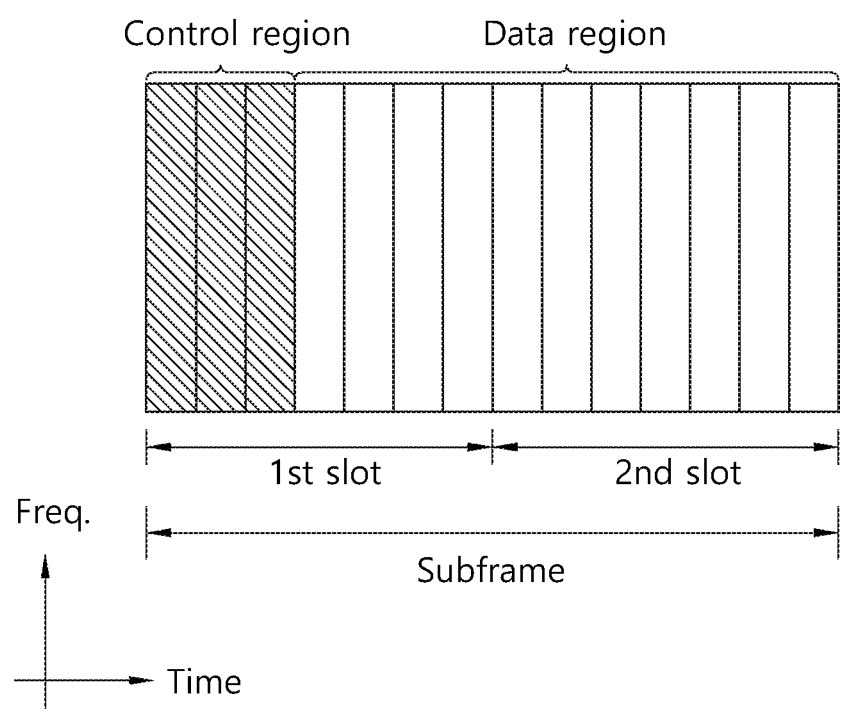
FIG. 3 shows an example of a structure of a downlink subframe in 3GPP LTE.

FIG. 3 shows an example of a structure of a downlink subframe in 3GPP LTE.

Referring to FIG. 3, a downlink subframe includes two contiguous slots. In the first slot of the downlink subframe, a maximum of the former three OFDM symbols become a control region to which a physical downlink control channel (PDCCH) is allocated, and the remaining OFDM symbols become a data region to which physical downlink shared channels (PDSCHs) are allocated. Control channels, such as a physical control format indicator channel (PCFICH) and a physical hybrid-ARQ indicator channel (PHICH), in addition to a PDCCH may be allocated to the control region. In this case, the inclusion of the three OFDM symbols in the control region is only an example. The number of OFDM symbols included in the control region of a subframe may be aware through a PCFICH. A PHICH carries hybrid automatic repeat request (HARQ) acknowledgement (ACK)/not-acknowledgement (NACK) information as a response to uplink data transmission.

A PDCCH may carry a downlink grant that provides notification of the resource allocation of downlink transmission on a PDSCH. UE may read downlink user data transmitted through a PDSCH by decoding control information transmitted through the PDCCH. Furthermore, the PDCCH may carry control information, used for physical uplink shared channel (PUSCH) scheduling, to the UE. The control information used for PUSCH scheduling is an uplink grant that provides notification of the resource allocation of uplink transmission.

A control region consists of an aggregation of a plurality of control channel elements (CCEs). A PDCCH is transmitted on an aggregation of one or some contiguous CCEs. A CCE corresponds to a plurality of resource element groups. A resource element group is used to define the mapping of a control channel to a resource element. In a downlink subframe, if a total number of CCEs is Ncce, CCE indices of 0 to Ncce,k−1 are assigned to CCEs. A total number of CCEs within a subframe may also be different in each subframe because the number of OFDM symbols included in a control region within a subframe may be different in each subframe.

Hereinafter, beamforming technology is described.

Beamforming may be divided into transmission beamforming performed at a transmitter and reception beamforming performed at a receiver. Transmission beamforming generally concentrates radio waves in a specified direction to a destination using a plurality of antennas, thereby increasing directivity. Here, a form of a plurality of antennas grouped may be referred to as an antenna array, and each antenna included in the antenna array may be referred to as an array element. The antenna array may be configured in various forms, for example, a linear array and a planar array. Further, using transmission beamforming enables an increase in the directivity of a signal, thus also increasing the transmission distance of the signal. In addition, since a signal is hardly transmitted in a direction other than an intended direction, signal interference of the receiver with another receiver is significantly reduced.

The receiver may perform beamforming on reception signals using a receiving antenna array. Reception beamforming concentrate received radio waves in a specified direction to increase the sensitivity of reception signals received in the specified direction and excludes a signal received in a direction other than the specified direction from the reception signals to provide a gain of blocking an interference signal.

Figure 4:
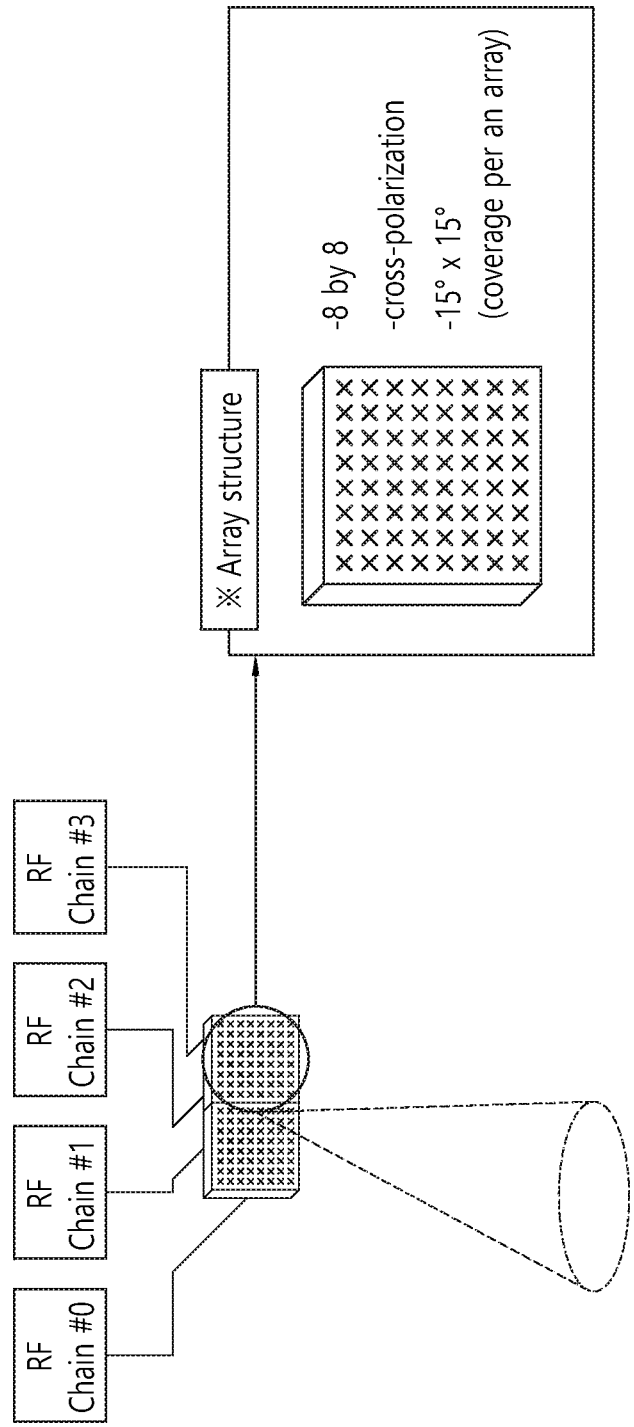
FIG. 4 illustrates an example of an antenna array-based antenna structure and a single beam.

FIG. 4 illustrates an example of an antenna array-based antenna structure and a single beam.

Referring to FIG. 4, one radio frequency (RF) beam (single beam) is defined using one antenna array including two sub-arrays. Here, one sub-array includes 8(H)*8(V)*2 (P) antennas (P represents Xpol) and has two RF chains. Further, one RF beam has a width of 15'(H)*15'(V).

Figure 5:
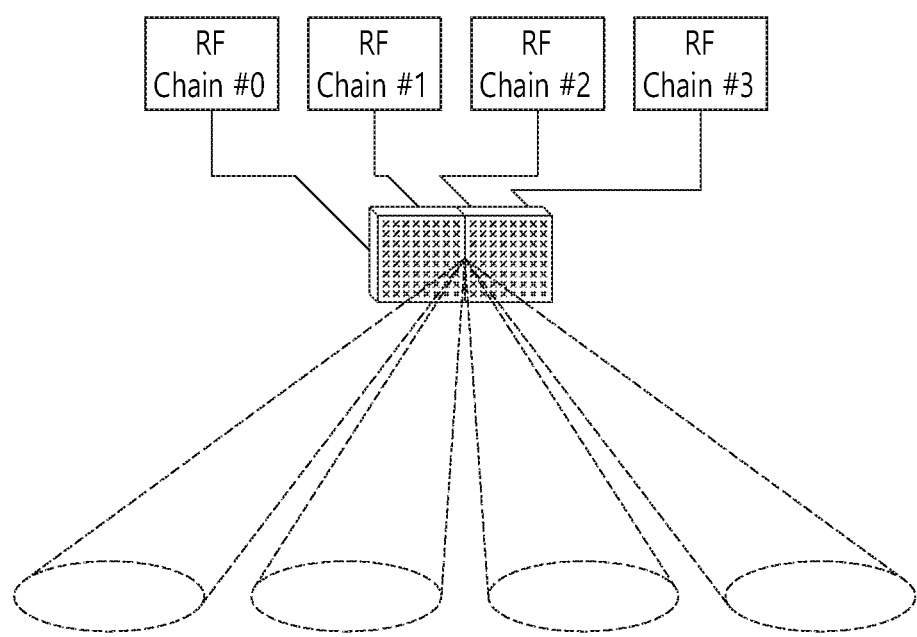
FIG. 5 illustrates an example of an antenna array-based antenna structure and a multi-beam.

FIG. 5 illustrates an example of an antenna array-based antenna structure and a multi-beam.

Referring to FIG. 5, RF beams (multi-beams) with different directions by each RF chain are defined. In this case, four beams by each RF chain may cover different areas.

When beam scanning is performed using the single beam or multi-beams, there are advantages and disadvantages illustrated below in Table 1.

TABLE 1

|  | Single beam | Multi-beam |
| --- | --- | --- |
| Advantage | Higher beam gain | Faster beam scanning |
| Disadvantage | Slower beam scanning | Lower beam gain |

Hereinafter, a method and an apparatus enabling a UE to feed back more accurate channel information on an available channel to a BS in an environment where a plurality of signals is transmitted to a single user or multiple users are proposed.

Figure 6:
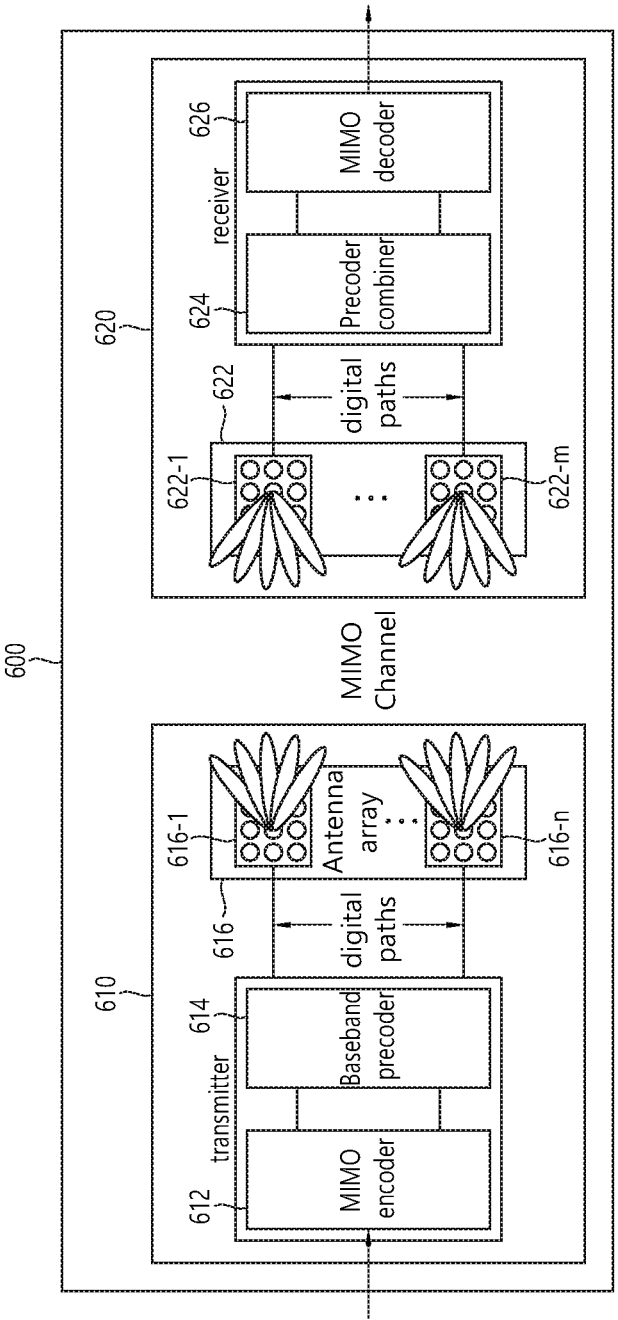
FIG. 6 is a diagram illustrating a configuration of a hybrid beamforming-based system to which an embodiment of the present specification is applicable.

FIG. 6 is a diagram illustrating a configuration of a hybrid beamforming-based system to which an embodiment of the present specification is applicable.

Referring to FIG. 6, the hybrid beamforming-based system 600 is configured to include, for example, a transmitter 610 and a receiver 620. The transmitter 610 includes a predetermined number of antenna arrays 616 each to form an MIMO channel. For the convenience of description, it is assumed that the transmitter 610 includes n antenna arrays 616-1, 616-2, . . . , and 616-n in total. Each of the antenna arrays 616-1, 616-2, . . . , and 616-n includes a predetermined number of antenna elements. Although it is illustrated herein that the antenna arrays each include the same number of antenna elements, the respective antenna arrays may include different numbers of antenna elements. The receiver 620 may include antenna arrays 622-1, 622-2, . . . , and 622-m configured the same as the antenna arrays of the transmitter 610. Here, it is assumed that the receiver 620 include, for example, m antenna arrays 622 in total. m and n each are a natural number of 1 or greater and may be set to the same value or different values depending on embodiments.

It is shown that the transmitter 610 includes an MIMO encoder 612 and a baseband precoder 614 to encode and precode a signal to transmit and the receiver 620 includes a baseband combiner 624 and an MIMO decoder 626 to combine and decode a signal received through the antenna arrays 622. The transmitter 610 and the receiver 620 are shown in a rough form including components for the convenience of description and may include specific components depending on embodiments of the present specification.

In the hybrid beamforming-based communication system mentioned above, when the transmitter transmits a plurality of signals to multiple users or a single user (hereinafter, referred to as 'multiplex transmission'), the transmitter may utilize channel information fed back from a corresponding receiver for various purposes. For example, the transmitter may apply a precoding mode based on the channel information in multiplex transmission to reduce interference between signals of a single user having a multi-antenna or interference between multiple users, thereby increasing system transmission capacity.

It is assumed that the hybrid beamforming-based communication system uses frequency division duplexing (FDD). In this case, when the receiver receives a reference signal from the transmitter, the receiver may estimate information on a channel between the transmitter and the receiver using the received reference signal. Further, the receiver feeds back the estimated channel information to the transmitter. For example, in an LTE-Advanced system, the feedback of the estimated channel information is referred to as the feedback of a precoding matrix indicator (PMI). The PMI fed back from the receiver is used for the transmitter to form a precoding matrix for the receiver. Specifically, the transmitter and the receiver store precoding matrices in advance, and the PMI indicates one of the precoding matrices.

Further, the receiver may further transmit a channel quality indicator (CQI) to the transmitter, and the transmitter may use the CQI for scheduling and the selection of an MCS.

When the hybrid beamforming-based communication system 600 operates in a millimeter wave band, the hybrid beamforming-based communication system 600 has a very narrow antenna form factor due to the high frequency band. Accordingly, it is very easy to configure the beamforming system using a plurality of array antennas. Beamforming in the millimeter wave band may apply different phase shift values to the antenna elements of each array, thereby transmitting a beam in a desired direction changed. Further, to compensate for high path loss in the millimeter wave band, the antenna elements may be disposed to have a narrow beam width.

Accordingly, the hybrid beamforming-based communication system 600 illustrated in FIG. 6 is different from an existing MIMO system in that the system 600 forms a beam using an antenna array.

Specifically, when the hybrid beamforming-based communication system is configured for multiple users, as a beam from each antenna array is shaper with an increasing in the number of included antennas arrays, the gain of an available channel for the antenna has a more significant difference. For example, in a beam division multiple access (BDMA) communication in which a single beam transmits a signal for only one user, the gain of an available channel for an antenna corresponding to the single beam may have a significantly higher value than those for other antennas, and the gain of an available channel for each of the other antennas may have a value approximating '0.'

Meanwhile, LTE-Advanced, which is one of the existing wireless communication standards, uses a code book based on a unitary matrix for PMI feedback. The unitary matrix has a property of a uniform channel gain with an insignificant deviation.

Further, in the hybrid beamforming-based communication system 600, a UE selects an analog beam corresponding to a beam formed by a physical antenna using a beam reference signal (BRS) and selects the best digital beam using a code book. The digital beam may correspond to a digital precoder. The UE may feed back the selected analog beam and the selected digital beam to a BS, and the BS may perform beamforming for the UE using the analog beam and the digital beam. The analog beam is rough, is wide in beam width, and varies slowly. The digital beam is precise, is narrow in beam width, and varies fast. Thus, the hybrid beamforming-based communication system 600 may finally obtain a sharp beam.

In an existing LTE system, primary synchronization channels (P-SCHs) are positioned in the last OFDM symbols of a zeroth slot and a tenth slot of a radio frame. The two P-SCHs use the same primary synchronization signal (PSS). The P-SCHs are used to obtain an OFDM symbol synchronization or slot synchronization. The PSS may use a Zadoff-Chu (ZC) sequence, and each PSS may represent a cell identity according to a root value of the ZC sequence. When there are three PSSs, the BS selects one of the three PSSs to transmit the PSS on the last OFDM symbols of the zeroth slot and the tenth slot.

Secondary synchronization channels (S-SCHs) are positioned in OFDM symbols directly preceding the last OFDM symbols of the zeroth slot and the tenth slot of the radio frame. The S-SCHs and the P-SCHs may be positioned in the contiguous OFDM symbols. The S-SCHs are used to obtain a frame synchronization. One S-SCH uses two secondary synchronization signals (SSSs). One S-SCH includes two PN sequences, that is, m-sequences. For example, when one S-SCH includes 64 subcarriers, two PN sequences with a length of 31 are mapped to one S-SCH.

The number or positions of OFDM symbols where the P-SCHs and the S-SCHs are deployed on slots are provided for illustrative purposes and may be changed variously depending on systems.

Hereinafter, a structure of a subframe for transmitting a synchronization signal in a millimeter wave band system is described.

Figure 7:
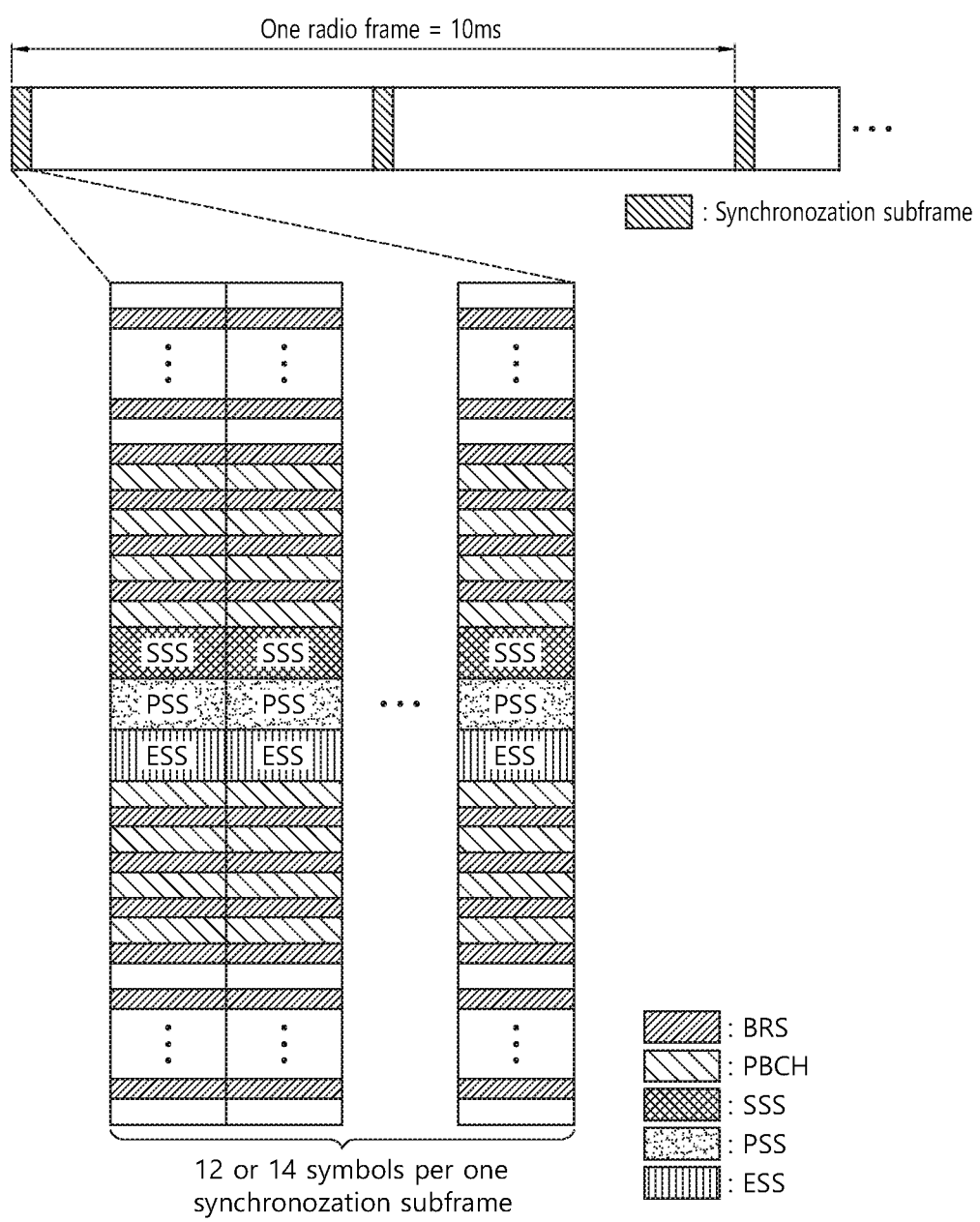
FIG. 7 illustrates an example of a structure of a synchronization subframe including a synchronization signal and a BRS according to an embodiment of the present specification.

FIG. 7 illustrates an example of a structure of a synchronization subframe including a synchronization signal and a BRS according to an embodiment of the present specification.

A reference signal, such as a channel state indicator (CSI)-reference signal (RS) is transmitted separately with respect to a plurality of beams supported by a BS according to a time division multiplexing (TDM) mode, a frequency division multiplexing (FDM) mode, or a code division multiplesing (CDM) mode. A CSI-RS has a wide beam radiation angle of about 120 degrees for each antenna port. Here, a BRS applicable in the embodiment of the present specification is a reference signal for feeding back beam state information on a plurality of beams. The BRS may have a narrow beam radiation angle as compared with the CSI-RS and thus may be applied to a sharp beam. Further, the BRS may be multiplexed by antenna port in one symbol according to the FDM mode, thus being transmitted during at least one subframe. Here, one antenna port may correspond to one among a plurality of beams per symbol of the at least one subframe. That is, as illustrated in FIG. 7, the BRS may be transmitted only via different resource elements (REs) by antenna port.

A subframe for transmitting the BRS may be referred to as a synchronization subframe. The synchronization subframe includes 12 or 14 symbols and may be transmitted according to a transmission period in which one synchronization subframe is transmitted every 5 ms. Here, it is assumed that the synchronization subframe includes 14 symbols (two slots) considering that the synchronization subframe is a normal CP. The symbols may correspond to OFDM symbols.

A UE acquires a downlink synchronization using a PSS, SSS, and/or extended synchronization signal (ESS) and selects an optimal beam using the BRS. Referring to FIG. 7, a synchronization signal, such as the PSS, SSS, and/or ESS, occupies a relatively narrow band based on a center frequency. On the contrary, the BRS occupies the entire system band of a BS and thus enables the search for an optimal beam based on a broadband channel.

The PSS, SSS, and/or ESS are multiplexed within one symbol by the FDM mode. Further, the BRS is multiplexed within one symbol by the FDM mode, like the synchronization signal including the PSS, SSS, and/or ESS. Since a sharp beam is used in the millimeter wave band, the synchronization subframe in FIG. 7 may be used to entirely cover an area corresponding to a beam radiation angle of 120 degrees. The synchronization subframe includes 14 PSSs, which indicate different directions. The UE achieves time synchronization with a PSS having the highest received power among the 14 PSSs.

Hereinafter, a beamforming procedure in a hybrid beamforming system is described.

First, beam acquisition and beam tracking are described. A UE acquires a beam for downlink reception and uplink transmission from a beam reference signal (BRS). For example, up to eight antennas may be supported for the BRS. The UE may measure reference signal received power (RSRP) with respect to the beam acquired from the BRS.

Further, the UE maintains a candidate beam set including beams acquired from four BRSs and records beam state information (BSI) on each beam. The BSI may include a beam index (BI) and beam reference signal received power (BRSRP). The candidate beam set may initially include four beams with the highest BRSRP.

In addition, the UE may report the BSI through an xPUCCH or xPUSCH as indicated by the BS. The xPUCCH and xPUSCH may correspond to a control channel and data channel used for a next-generation wireless communication system. The BS may transmit a BSI trigger through DL downlink control information (DCI), UL DCI, and a random access response (RAR) grant.

When the BSI is reported through an xPUCCH, the UE reports BSI on one beam having the highest BRSRP in the candidate beam set. When the BSI is reported through an xPUSCH, the UE reports BSI(s) on N beams having the highest BRSRP in the candidate beam set (N={1, 2, 4}). N is a two-bit BSI trigger provided by the BS. The BSI is reported in a BRSRP descending order.

Next, beam refinement is described. A beam refinement reference signal (BRRS) is triggered by a beam refinement information (BRI) request field included in DCI. Further, the UE may request a BRRS using a scheduling request (SR). An upper layer provides different combinations of band numbers, cyclic shifts, and parameters for a physical layer in order to transmit an initial request for a BRRS.

Time and frequency resources available for the UE to report BRI may be indicated by the BS. The BRI includes a BRRS resource index (BRRS-RI) and BRRS received power (BRRS-RP).

Next, beam recovery is described. When the UE detects that a currently serving beam is misaligned and has BSI for beam recovery, the UE needs to perform a beam recovery process.

The UE, which is UL-synchronized, transmits a scheduling request by a scheduling request preamble. The scheduling request preamble is set by the upper layer and is used exclusively for beam recovery. Upon receiving this request, the BS may initialize a BSI report procedure.

The UE, which is UL-desynchronized, transmits a random access preamble for random access-based contention. When triggering a BSI report is scheduled by an RAR, the UE reports N pieces of BSI in message 3 as in UCI multiplexing.

As described above, a CSI-RS has a beam radiation angle of about 120 degrees for each antenna port and thus may be applied for a broad beam, while a BRS applicable in the embodiment of the present specification may have a narrow beam radiation angle as compared with the CSI-RS and thus may be applied to a sharp beam.

Here, no beam mismatch occurs between the BS and the UE in the use of a CSI-RS applicable to a broad beam, a beam mismatch may occurs during a beam tracking process after synchronization between the BS and the UE when a BRS applicable to a sharp beam is used. The occurrence of a beam mismatch may be determined based on whether the received power (RP) of a specific beam is very low or the quality of the beam deteriorates.

When a beam mismatch occurs, it is needed to resend BSI for beam reconfiguration between a transmitting beam (Tx beam) of the BS and a receiving beam (Rx beam) of the UE.

Here, the BS may transmit a trigger message to estimate BSI and to trigger an operation of reporting the BSI. Further, the BS may allocate a resource so that the UE reports BSI. Accordingly, the UE may measure an analog beam of each BS at each antenna port using the previously defined BRS and may feed back or report BSI on the beam to the BS. Here, the analog beam of the BS may correspond to a transmitting beam of the BS.

The UE may measure received power with respect to a transmitting beam of each BS to select an optimal beam. Further, the UE may report beam index (BI) information and received power (RP) information on the optimal beam to the BS.

When the UE determines that a beam mismatch is significant, the UE may feed beam related UCI back to the BS. The beam related UCI is control information on a beam, which may include BSI or BRI.

Here, the present specification proposes a method for the UE to request the multiplexing of beam related UCI on an xPUSCH or to request a BRRS resource using a dedicated scheduling request resource. That is, the UE requests the multiplexing of beam related UCI on an xPUSCH or requests a BRRS resource using the same scheduling request resource, thus causing ambiguity. Hereinafter, operations of the BS and the UE to solve such ambiguity are described.

For example, the UE requests the multiplexing of beam related UCI on an xPUSCH or requests a BRRS resource using the same dedicated scheduling request. Since two different operations are performed in the same dedicated scheduling request resource, an ambiguity issue may occur in the BS. To overcome the ambiguity issue, the BS deals with the ambiguity issue in view of scheduling. That is, the BS selects one of the following two methods in response to the scheduling request. The UE performs a subsequent operation according to the method selected by the BS.

Figure 8:
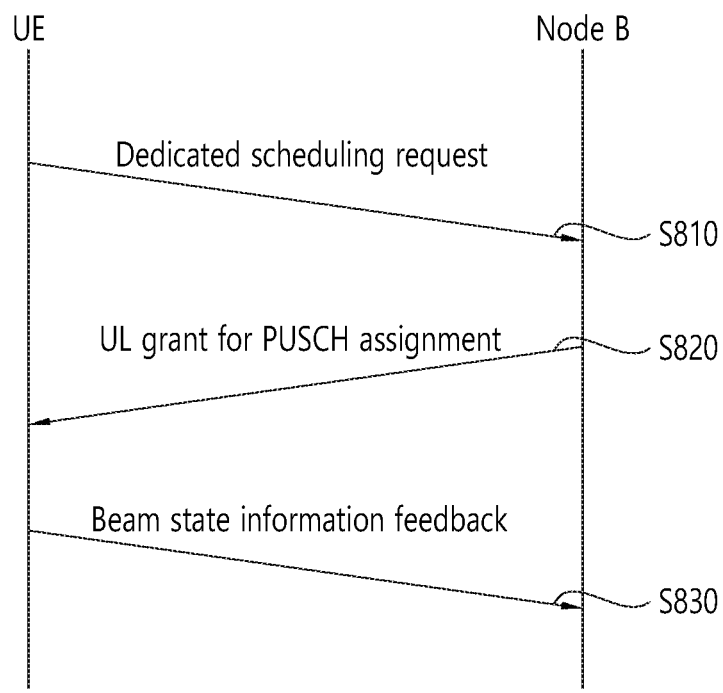
FIG. 8 illustrates an example in which a base station configures an uplink grant based on a dedicated scheduling request according to an embodiment of the present specification.
Figure 9:
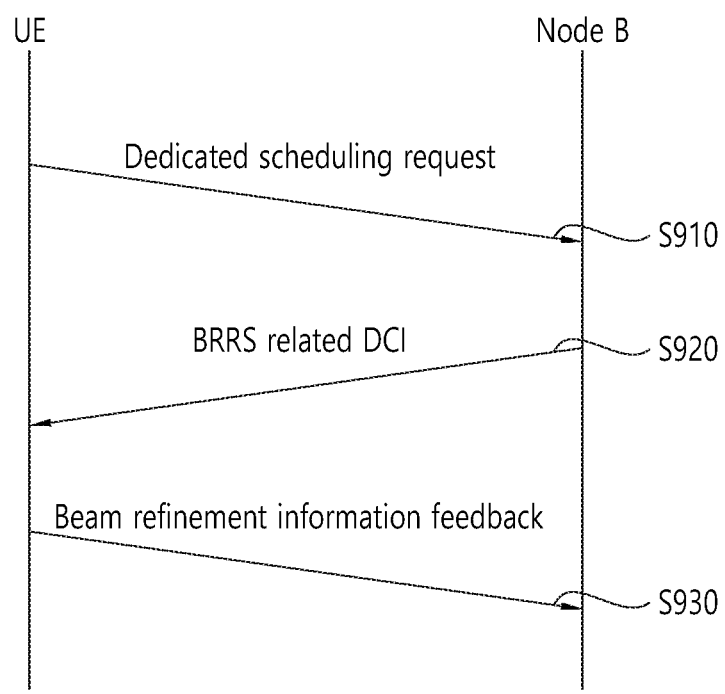
FIG. 9 illustrates an example in which a base station allocates a BRRS resource based on a dedicated scheduling request according to an embodiment of the present specification.

Specifically, the two methods available for the BS are illustrated in FIG. 8 and FIG. 9. According to a first method, the BS transmits an uplink grant to indicate whether to allow the multiplexing of beam related UCI on an xPUSCH (illustrated in FIG. 8). According to a second method, the BS allocates a BRRS resource to the UE through BRRS related DCI (illustrated in FIG. 9). Accordingly, the UE receives a response to the scheduling request to multiplex BSI on an xPUSCH to be transmitted to the BS or to perform beam refinement based on a BRRS resource.

FIG. 8 illustrates an example in which the BS configures an uplink grant based on a dedicated scheduling request according to an embodiment of the present specification.

Referring to FIG. 8, the UE transmits a dedicated scheduling request to the BS (S810). When the BS recognizes the dedicated scheduling request as a BSI request feedback, the BS sets an xPUSCH UCI feedback request field of an uplink grant to a value greater than 0 and transmits the uplink grant to the UE (S820). Here, the xPUSCH UCI feedback request field includes n bits. When the xPUSCH UCI feedback request field is two bits, 00 indicates disabled, 01 indicates an operation of transmitting one piece of beam information, 10 indicates an operation of transmitting two pieces of beam information, and 11 indicates an operation of transmitting four pieces of beam information. That is, when a beam mismatch occurs between the BS and the UE, the UE needs to report BSI on a next best candidate beam to the BS, in which the number of next best candidate beams may be indicated using the two bits. When the uplink grant is received, the UE multiplexes BSI on the xPUSCH to be transmitted to the BS (S830).

FIG. 9 illustrates an example in which the BS allocates a BRRS resource based on a dedicated scheduling request according to an embodiment of the present specification.

Referring to FIG. 9, the UE transmits a dedicated scheduling request to the BS (S910). When the BS recognizes the dedicated scheduling request as a request for a BRRS resource, the BS allocates a BRRS resource to the UE through BRRS related DCI (S920). The UE performs beam refinement through the DCI. That is, the UE transmits BRI to the BS (S930).

FIG. 9 illustrates that when a beam mismatch occurs between the BS and the UE, a next best candidate beam may also be mismatched between the BS and the UE, thus proposing a method for matching a new beam pair between the BS and the UE. Here, a beam reference signal (BRS) may be a reference signal used to roughly match a beam pair in an initial stage of a beamforming procedure, and a BRRS may be a reference signal used to more accurately match the beam pair in order to directly transmit and receive data after roughly matching the beam pair. That is, the UE may perform beam refinement on a rough beam through a BRRS.

Alternatively, the UE requests a resource for feeding back beam related information using the dedicated scheduling request. The beam related information may include the foregoing BSI and BRI. Here, the BS may allocate a feedback resource to the UE using DL DCI, UL DCI, and/or a random access channel (RACH) response.

That is, the UE requests the resource for feeding back the beam related information using the dedicated scheduling request for beam recovery. The BS may process the scheduling request according to three methods illustrated below.

First, the BS allocates a PUCCH resource to the UE using DL DCI in response to the scheduling request. Accordingly, the UE feeds the beam related information back to the BS using the PUCCH resource.

Second, the BS allocates a PUSCH resource to the UE using UL DCI (for example, an uplink grant) in response to the scheduling request. Accordingly, the UE multiplexes the beam related information on the PUSCH resource to be fed back to the BS.

Third, when the dedicated scheduling request is defined as an RACH preamble, the BS allocates a feedback resource to the UE through an RACH response in response to the scheduling request. The UE feeds back the beam related information using the resource defined in the RACH response.

Meanwhile, the BS may notify the UE of a feedback resource (for example, a PUSCH and PUCCH) via a medium access control-control element (MAC-CE), regardless of dedicated scheduling request types or scheduling by the BS.

Unlike the foregoing embodiment, the UE may feed the beam related information for beam recovery back to the BS through an MAC-CE in another embodiment.

Figure 10:
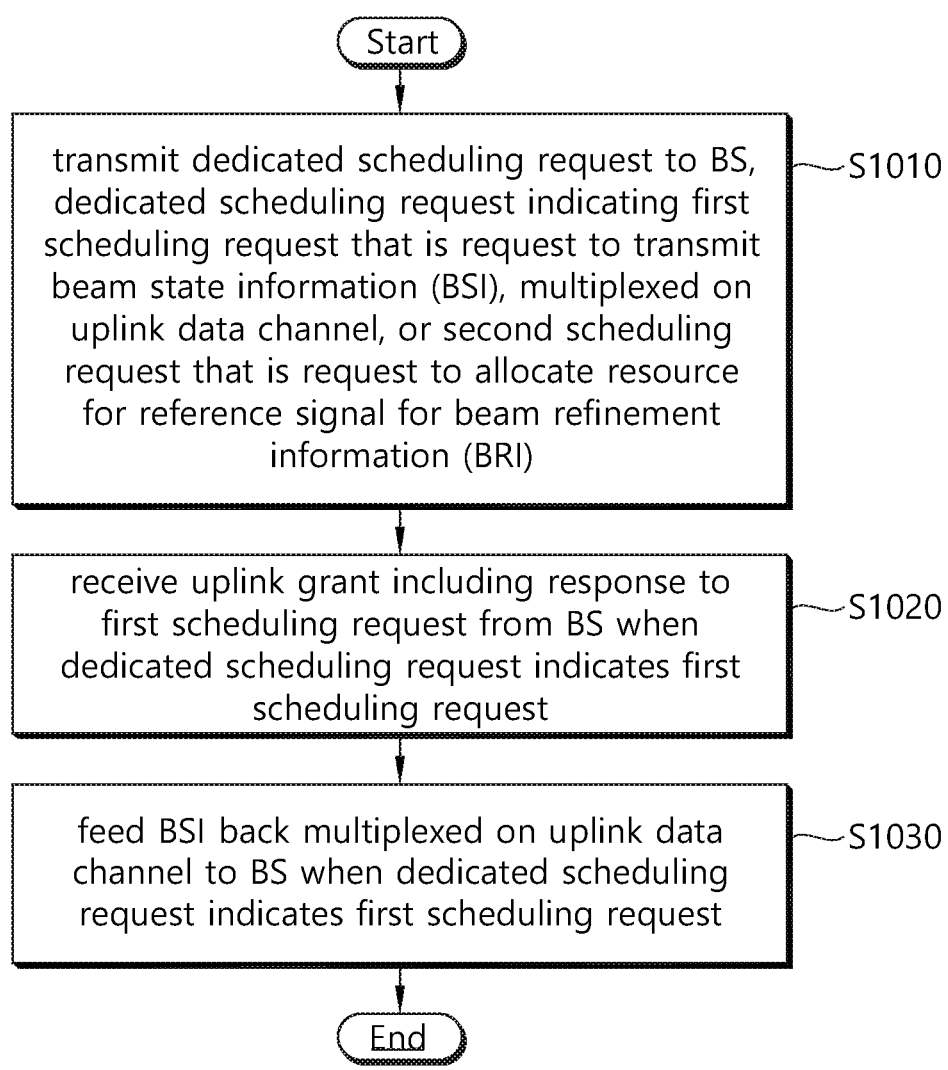
FIG. 10 is a flowchart illustrating a procedure for performing communication based on hybrid beamforming according to an embodiment of the present specification.

FIG. 10 is a flowchart illustrating a procedure for performing communication based on hybrid beamforming according to an embodiment of the present specification.

First, in operation S1010, a UE transmits a dedicated scheduling request to a base station (BS). The dedicated scheduling request indicates a first scheduling request that is a request to transmit beam state information (BSI), multiplexed on an uplink data channel, or a second scheduling request that is a request to allocate a resource for a reference signal for beam refinement information (BRI).

Here, the uplink data channel may correspond to an xPUSH. That is, the first scheduling request may correspond to a request to multiplex beam related UCI on the xPUSCH.

The reference signal for the BRI may correspond to a beam refinement reference signal (BRRS).

When the dedicated scheduling request indicates the first scheduling request, the UE receives an uplink grant including a response to the first scheduling request from the BS in operation S1020. The response to the first scheduling request may correspond to scheduling information from the BS that enables the UE to feed back BSI.

In operation S1030, the UE multiplexes the BSI on the uplink data channel to be fed back to the BS.

The BSI may include a beam index and a beam received power. The beam index and the beam received power may be information on an optimal beam for the UE. The optimal beam for the UE may correspond to a beam having the highest received power in a candidate beam set. Specifically, when a beam mismatch occurs between the BS and the UE, the UE needs to report BSI on a next best candidate beam to the BS, in which the number of next best candidate beams may be indicated with bits of the uplink grant.

For example, suppose that the uplink grant includes a field of two bits. When the field indicates 00, the candidate beam set may include no candidate beam (disabled). When the field indicates 01, the candidate beam set may include one candidate beam. When the field indicates 10, the candidate beam set may include two candidate beams. When the field indicates 11, the candidate beam set may include four candidate beams.

When the dedicated scheduling request indicates the second scheduling request, the UE may receive downlink control information indicating the allocation of the resource for the reference signal for the BRI from the BS. Further, the UE may feed the BRI back to the BS based on the downlink control information.

Here, when a beam mismatch occurs between the BS and the UE, a next best candidate beam may also be mismatched between the BS and the UE, thus proposing a method for matching a new beam pair between the BS and the UE. Here, a beam reference signal (BRS) may be a reference signal used to roughly match a beam pair in an initial stage of a beamforming procedure, and a BRRS may be a reference signal used to more accurately match the beam pair in order to directly transmit and receive data after roughly matching the beam pair. That is, the UE may perform beam refinement on a rough beam through a BRRS.

The BRI may include an index of the resource for the reference signal for the BRI and the received power of the reference signal for the BRI.

The BSI and the BRI may be fed back through a medium access control-control element (MAC-CE).

Figure 11:
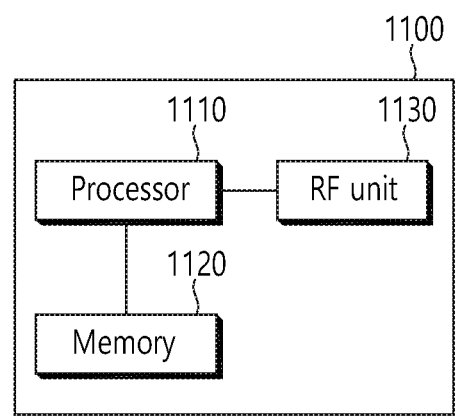
FIG. 11 is a block diagram showing an apparatus for wireless communication for implementing an embodiment of the present specification.

FIG. 11 is a block diagram showing an apparatus for wireless communication for implementing an embodiment of the present invention.

An apparatus 1100 for wireless communication includes a processor 1110, a memory 1120 and a radio frequency (RF) unit 1130.

The processor 1110 may be configured to implement proposed functions, procedures and/or methods described in this description. Layers of the radio interface protocol may be implemented in the processor 1110. The processor 1110 may handle a procedure explained above. The memory 1120 is operatively coupled with the processor 1110, and the RF unit 1130 is operatively coupled with the processor 1110.

The processor 1110 may include application-specific integrated circuit (ASIC), other chipset, logic circuit and/or data processing device. The memory 1120 may include read-only memory (ROM), random access memory (RAM), flash memory, memory card, storage medium and/or other storage device. The RF unit 1130 may include baseband circuitry to process radio frequency signals. When the embodiments are implemented in software, the techniques described herein can be implemented with modules (e.g., procedures, functions, and so on) that perform the functions described herein. The modules can be stored in memory 1120 and executed by processor 1110. The memory 1120 can be implemented within the processor 1110 or external to the processor 1110 in which case those can be communicatively coupled to the processor 1110 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

Furthermore, the technical concepts in the described embodiments may be identically applied, and embodiments in which the number of subframes and the number of special symbols within a radio frame are differently defined may be included in the technical scope of this specification.

What is claimed is:

1. A method for performing, by a user equipment (UE), communication based on hybrid beamforming in a wireless communication system, the method comprising:

transmitting a dedicated scheduling request to a base station (BS), the dedicated scheduling request indicating a first scheduling request that is a request to transmit beam state information (BSI), multiplexed on an uplink data channel, or a second scheduling request that is a request to allocate a resource for a reference signal for beam refinement information (BRI);

when the dedicated scheduling request indicates the first scheduling request, receiving an uplink grant comprising a response to the first scheduling request from the BS; and feeding the BSI back, multiplexed on the uplink data channel, to the BS.

2. The method of claim 1, further comprising:

when the dedicated scheduling request indicates the second scheduling request, receiving downlink control information indicating allocation of the resource for the reference signal for the BRI from the BS; and feeding the BRI back to the BS based on the downlink control information.

3. The method of claim 2, wherein the BSI comprises a beam index and a beam received power, the beam index and the beam received power are information on an optimal beam for the UE, and the optimal beam for the UE corresponds to a beam having a highest received power in a candidate beam set.

4. The method of claim 3, wherein the uplink grant comprises a field of two bits;
  when the field indicates 00, the candidate beam set comprises no candidate beam;
  when the field indicates 01, the candidate beam set comprises one candidate beam;
  when the field indicates 10, the candidate beam set comprises two candidate beams; and
  when the field indicates 11, the candidate beam set comprises four candidate beams.

5. The method of claim 2, wherein the BRI comprises an index of the resource for the reference signal for the BRI and the received power of the reference signal for the BRI.

6. The method of claim 2, wherein the BSI and the BRI are fed back through a medium access control-control element (MAC-CE).

7. A user equipment (UE) for performing communication based on hybrid beamforming in a wireless communication system, the UE comprising:
  a radio frequency (RF) unit that transmits and receives a radio signal; and
  a processor operatively connected to the RF unit,
  wherein the processor: transmits a dedicated scheduling request to a base station (BS), the dedicated scheduling request indicating a first scheduling request that is a request to transmit beam state information (BSI), multiplexed on an uplink data channel, or a second scheduling request that is a request to allocate a resource for a reference signal for beam refinement information (BRI);
  when the dedicated scheduling request indicates the first scheduling request,
  receives an uplink grant comprising a response to the first scheduling request from the BS; and
  feeds the BSI back, multiplexed on the uplink data channel, to the BS.

8. The UE of claim 7, wherein when the dedicated scheduling request indicates the second scheduling request, the processor receives downlink control information indicating allocation of the resource for the reference signal for the BRI from the BS and feeds the BRI back to the BS based on the downlink control information.

9. The UE of claim 8, wherein the BSI comprises a beam index and a beam received power,
  the beam index and the beam received power are information on an optimal beam for the UE, and
  the optimal beam for the UE corresponds to a beam having a highest received power in a candidate beam set.

10. The UE of claim 9, wherein the uplink grant comprises a field of two bits;
  when the field indicates 00, the candidate beam set comprises no candidate beam;
  when the field indicates 01, the candidate beam set comprises one candidate beam;
  when the field indicates 10, the candidate beam set comprises two candidate beams; and
  when the field indicates 11, the candidate beam set comprises four candidate beams.

11. The UE of claim 8, wherein the BRI comprises an index of the resource for the reference signal for the BRI and the received power of the reference signal for the BRI.

12. The UE of claim 8, wherein the BSI and the BRI are fed back through a medium access control-control element (MAC-CE).

\* \* \* \* \*